United States Patent [19]

Gerbe

[11] Patent Number: 4,697,879
[45] Date of Patent: Oct. 6, 1987

[54] AIRBORNE SYSTEM FOR DISPLAY OF COLLIMATED IMAGES

[75] Inventor: Jean-Pierre Gerbe, Pessac, France

[73] Assignee: Thomson CSF, Paris, France

[21] Appl. No.: 835,340

[22] Filed: Mar. 3, 1986

[30] Foreign Application Priority Data

Mar. 1, 1985 [FR] France ................. 85 03083

[51] Int. Cl.[4] .................. G02B 27/10; H04N 7/18
[52] U.S. Cl. .................. 350/174; 358/250; 340/705; 350/602
[58] Field of Search ............. 350/174, 602; 340/705, 340/716; 358/250, 103, 104

[56] References Cited

U.S. PATENT DOCUMENTS

| | | | |
|---|---|---|---|
| 3,297,822 | 1/1967 | Braid | 350/174 |
| 3,620,592 | 11/1971 | Freeman | 358/250 |
| 3,885,095 | 5/1975 | Wolfson et al. | 350/174 |
| 3,936,148 | 2/1976 | Ellis | 350/174 |
| 4,193,666 | 3/1980 | Cojan . | |
| 4,264,134 | 4/1981 | Ellis . | |
| 4,350,411 | 9/1982 | Rogers | 350/174 |

FOREIGN PATENT DOCUMENTS

| | | | |
|---|---|---|---|
| 9332 | 4/1900 | European Pat. Off. | 350/174 |
| 2425914 | 12/1974 | Fed. Rep. of Germany . | |
| 2521874 | 12/1976 | Fed. Rep. of Germany . | |
| 3103045 | 8/1982 | Fed. Rep. of Germany . | |
| 2006981 | 5/1979 | United Kingdom | 350/174 |

Primary Examiner—Jon W. Henry
Attorney, Agent, or Firm—Cushman, Darby & Cushman

[57] ABSTRACT

An airborne display system is provided for viewing a high-definition collimated video image or a high-resolution collimated synthetic image or a combination of both images in superimposed relation by means of head-down display devices mounted on an aircraft instrument panel. The display system comprises a first head-down collimating assembly constituted by a monochrome cathode-ray tube and an optical objective, and a second head-down collimating assembly constituted by a color cathode-ray tube and the same collimating objective. An optical relay device is associated with a partly transparent mirror for transmitting the monochrome image and deviating the intermediate color image formed by the optical relay device to the objective. The reflected image as well as the transmitted image are both located at a distance from the optical objective which is equal to the focal distance.

9 Claims, 2 Drawing Figures

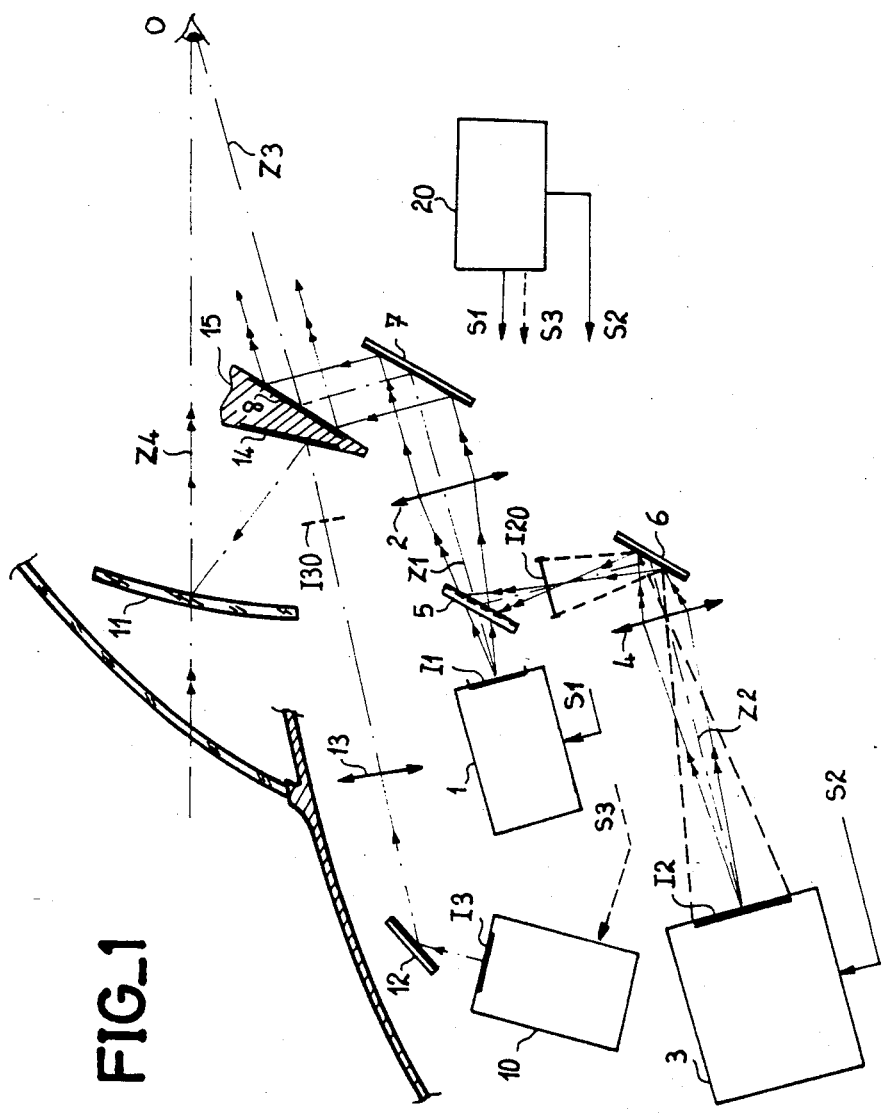

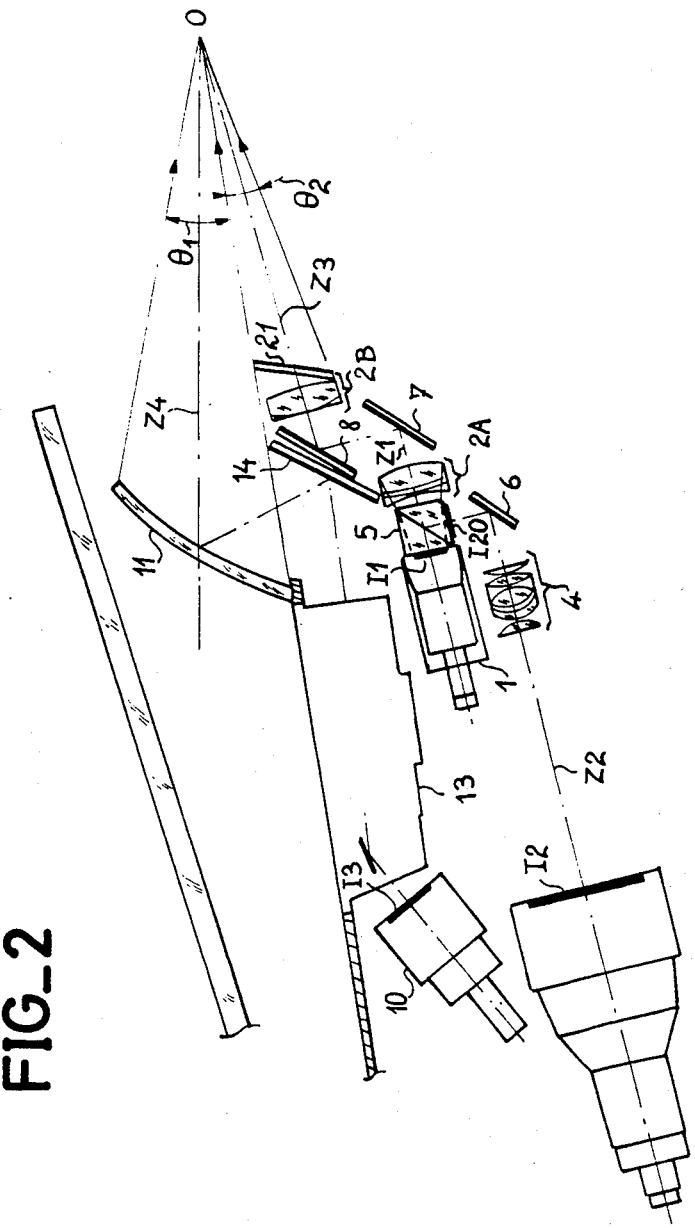
FIG_2

AIRBORNE SYSTEM FOR DISPLAY OF COLLIMATED IMAGES

BACKGROUND OF THE INVENTION

1. Field of the Invention

The present invention relates to an airborne system for display of collimated images.

2. Description of the Prior Art

Airborne equipments call for the use of multiple display devices in ever-increasing numbers. One particular type is the so-called "head-down" display device mounted on aircraft instrument panels. Another type constitutes a so-called "head-up" display device or collimator for superimposing a collimated image on the view of the external landscape.

It is a known practice to employ a "head-up" collimator in conjunction with a "head-down" display device which is also arranged to form a collimated image. The two devices are positioned in such a manner that the collimated images are seen in continuity in two successive fields and do not require accommodation of the pilot's eyes as he looks from one image to the other. It is also known to use this arrangement with a second device for non-collimated head-down display.

SUMMARY OF THE INVENTION

The invention relates to a system for display of collimated images, said system being primarily intended to equip the instrument panel of a combat aircraft. The system is intended to provide the pilot with images placed just beneath the view of the external landscape as seen from the aircraft. In more precise terms, the display system is designed to present two types of images. A first wide-field image corresponding to a high-definition video image can be delivered by a sensor of the television camera type either by day or night, or by a forward-looking infrared device (FLIR), and can correspond to the external landscape. A second image in synthetic video provides a symbolic color representation of a conventional head-down display but with very high resolution.

Either of these two images can be selected by the pilot as a function of requirements and of different flight stages. Consideration can also be given to the possibility of viewing these images in superimposed relation.

The first image must be produced in monochrome since a color representation cannot provide sufficient resolution. A monochrome sensor can produce an image composed of 875 or 1000 lines and of 1000 dots per line.

In contrast, in order to obtain a second image which in this case is of synthetic nature and of high resolution, it is necessary to employ a color cathode-ray tube (CRT) of large size since small-sized color tubes fail to provide a sufficient degree of resolution. A shadow-mask picture tube provides a number of dots per line of the order of 300 to 400 with a pitch of 0.2 mm.

For the fine-detail displays required in the case of the monochrome channel and in the case of the color channel, high-key image generators are employed. These generators are cathode-ray tubes (CRTs) consisting respectively of a black and white tube and (in the case of the other channel) a three-color shadowmask tube, for example. Taking into account the volume occupied, integration and mounting of these elements on the aircraft instrument panel is not an easy task. The mounting operation is made even more complex if there is added a collimated head-up display channel for which the high-key image generator is also a CRT mounted on an instrument panel and if it is desired in addition to produce collimated images for the monochrome and color channels of the head-down display devices in order to avoid any need for accommodation of the observer's eyes.

The aim of the invention is to provide a solution which makes it possible to remove the difficulties, requirements and limitations mentioned in the foregoing.

To this end, the invention accordingly proposes an airborne system for the display of collimated images comprising a first and a second head-down sighting device provided as instrument panel equipment for the purpose of forming a first and a second image to be displayed respectively from a first and a second high-key image generator, a first sighting device aforesaid being provided with an optical device for collimating the first image. The airborne system is distinguished by the fact that the optical collimating device also serves to collimate the second image by means of an optical relay objective for transferring the second image in order to form an intermediate image and by means of an optical mixing element interposed on the optical paths between the first image and the optical device and between the intermediate image and said optical device so that these two images can each be seen at the focus of said optical collimating device.

BRIEF DESCRIPTION OF THE DRAWINGS

Other features of the invention will be more apparent upon consideration of the following description and accompanying drawings, wherein:

FIG. 1 is a diagram of a display system in accordance with the invention;

FIG. 2 illustrates one example of construction of the system of FIG. 1.

DESCRIPTION OF THE PREFERRED EMBODIMENTS

Reference being made to FIG. 1, there can be seen the first head-down sighting device formed by a first high-key image generator 1 associated with an optical collimating device 2 for forming an image at infinity of the image I 1 produced by said generator. In order to obtain a high-definition image, the generator 1 is a monochrome cathode-ray tube (CRT) and the image I 1 is the image formed on the flat or substantially flat screen of the CRT.

The second sighting device is formed in a similar manner by a second high-key image generator 3 such as a shadowmask color CRT which produces a color image of the synthetic symbol video to be displayed.

In order to collimate this second image I 2 which is also formed on the screen of the color cathode-ray tube 3, use is made of a relay objective 4 which transfers the image I 2 so as to form an intermediate image I 20 in proximity to the optical collimating device 2. A complementary optical mixing element 5 is interposed on the optical paths between the image plane I 1 and the objective 2 and between the intermediate image I 20 and the same objective, the optical system being so arranged that the two images I 1 and I 20 are seen from the objective 2 as being positioned at its focus.

Assuming simply that the optical mixing element is constituted by a partially reflecting mirror 5 and considering the plane images I 1 and I 2 and the image I 20 formed in the plane which is symmetrical with the plane of the image I 1 as seen through the mirror 5, the plane I 1 corresponding to the focal plane of the objective 2 along the axis Z1 of this optical system, it is apparent that the relay objective 4 must be so determined as to carry out the image transfer between the plane I 2 and the plane corresponding to the image I 20. The distance from the image plane I 20 to the optical device 2 by reflection from the mirror 5 also corresponds to the focal distance of the optical device 2.

The other optical elements shown in the drawings are complementary elements which permit optical-axis deviations. Said elements consist of a first reflecting plane mirror 6 which deviates the optical axis Z2 of the color cathode-ray tube 3 and of the optical relay device 4 to the optical mixing element 5 for subsequent reflection in the direction Z1 of the monochrome channel. The directions Z1 and Z2 can be parallel as shown in the figures or inclined in practice at a very small angle with respect to each other. The set of reflecting plane mirrors 7 and 8 is intended at the exit to displace the axis Z1 in the upward direction with a final orientation Z3 which extends to an observation point O. The optical assembly 7, 8 permits a downward displacement of the head-down sighting devices and frees a space for positioning elements which are necessary for head-up display. These elements similarly comprise a third high-key image generator 10 and an optical collimating and mixing element 11 for viewing the corresponding image I 3 which is reflected to infinity and superimposed on the view of the external landscape as seen from the observation point O. The optical axis of the cathode-ray tube 10 is thus deviated in a final direction Z4 which passes through the point O. Use is also made of additional optical elements comprising a reflecting mirror 12 for modifying the orientation of the original optical axis and an optical relay device 13 which also carries out transfer of the image I 3 into an intermediate plane for forming the intermediate image I 30. Said intermediate plane corresponds to the focal plane of the optical element 11. It is also worthy of note that the reflecting mirror I 14 modifies the direction of the optical axis and deviates the path in the direction of the optical collimating element 11 which is preferably constituted by a holographic element corresponding to a spherical mirror. The set of mirrors 14 and 8 can be formed by a single element such as a prism 15, the corresponding faces of which have been given a reflecting treatment and the vertex angle of which has the desired value for forming the optical paths indicated in the foregoing.

FIG. 2 illustrates the same system which is arranged in a similar manner but in an embodiment which is more representative of a practical application. The same elements are designated by the same references. There can be seen in this figure the optical mixing element 5 constituted by the association of two half-cubes. The diagonal face which forms a separation between said half-cubes has been treated in order to be partly transparent with a view to transmitting the image I 1 of the cathode-ray tube 1 and reflecting the image I 2 derived from the cathode-ray tube 2. One face of one of the half-cubes is applied against the screen of the monochrome cathode-ray tube 1. In a symmetrical manner with respect to the diagonal face, the relay objective 4 produces the intermediate image I 20 on the symmetrical face of the other half-cube. The optical collimating device is formed of two components, namely a first component 2A located between the optical mixing element 5 and the reflecting mirror 7 and a second component 2B located downstream of the mirror 8. The optical components 2A and 2B have an optical-axis direction which is constituted respectively by the axes Z1 and Z3. This division of the optical collimating device facilitates positioning of the head-down displays. The intermediate image I 20 is a smaller version of the image I 2 formed by the shadow-mask color tube 3. The collimating device 2A, 2B achieves optical interdependence between the pupil of the relay objective 4 and the observer's eye placed at the point of observation 0, with a view to minimizing the volume of the optical relay device while ensuring that the light rays which enter the optical device 4 are projected in the vicinity of the observer's eyes and are not intercepted by the edges of the optical device components 2A, 2B and that vignetting of the image on the color channel is consequently limited to a maximum extent (it is recalled that vignetting is a phenomenon in which part of a light beam is obstructed by the edges of lenses).

As illustrated in FIG. 2, it is particularly advantageous to ensure juxtaposition of the fields of view between the head-up display field $\theta 1$ and the head-down display field $\theta 2$ in which it is possible to observe either the collimated image I 1 or the collimated image I 2 or else both images in superimposed relation.

Ancillary control means are provided for initiating turn-on of the head-up and/or head-down display devices as desired. These control means are represented schematically in FIG. 1 by a block 20 which is capable of generating control signals S1, S2 as well as S3 if necessary for head-up display. These signals serve to put the corresponding image generators into service by application of very-high-voltage supplies, for example.

The monochrome image offers a large number of operational applications such as viewing of the landscape beneath the nose of the aircraft in order to facilitate landing either on airport runways or flight decks and in continuity with the head-up collimator, night landscape viewing in the case of an infrared image by means of a FLIR device or the like, television tracking in a lasertype target-designating system, and so on.

As a complementary feature, a filter 21 can be placed downstream of the optical device component 2B on the path which extends to the observer in order to attenuate parasitic reflections from the exterior. Consideration could be given to a directional filter with microflaps, for example, or to a spectral or interferential filter.

What is claimed is:

1. An airborne system for the display of collimated images comprising a first and a second head-down sighting device provided as instrument panel equipment for the purpose of displaying a first and a second image produced respectively by a first and a second high-key image generator, the first sighting device aforesaid being provided with an optical device for collimating the first image, wherein the optical collimating device also serves to collimate the second image by utilizing in the second device an optical relay objective for transferring the second image in order to form an intermediate image at a distance from an optical mixing element interposed on the optical paths between the first image and the optical collimating device and between the intermediate image and said optical collimating device so that these two images are each seen at the focus of the optical collimating device, the function of said first generator being to produce a high-definition video frequency image and the function of said second generator being to produce a synthetic high-resolution symbol image.

2. A system according to claim 1, wherein the intermediate image formed by the optical relay device is a smaller version of the second image and located in a plane which is symmetrical with the plane containing the first image with respect to a partly transparent mirror constituting the optical mixing element aforesaid.

3. A system according to claim 2, wherein the first high-key image generator utilizes a monochrome cathode-ray tube for producing said video frequency image and wherein the second high-key image generator utilizes a color cathode-ray tube for producing said synthetic symbol image.

4. A system according to claim 3, wherein the color cathode-ray tube is a shadowmask tube.

5. A system according to any one of claims 1 to 4, wherein said system further comprises a head-up display device in which the head-up display field is in juxtaposed relation to the common head-down display field of said first and second images.

6. A system according to any one of claims 1 to 3, wherein the optical collimating device is constructed in the form of two components in order to facilitate positioning and mounting of the display devices on the instrument panel, a first component being followed by a first plane mirror for reflecting towards a second reflecting plane mirror which is in turn followed by the second component of said optical collimating device.

7. A system according to any one of claims 1 to 3, wherein the optical mixing element is formed by the assembly of two half-cubes in which the diagonal boundary face is treated so as to be partly transparent, the first image being formed on one face of the cube and the intermediate image being formed on the face which is symmetrical with respect to said diagonal boundary face.

8. A system according to claim 3, wherein the two cathode-ray tubes have substantially parallel optical-axis directions and wherein a third reflecting plane mirror is employed for deviating the direction of one of said cathode-ray tubes towards the optical mixing element.

9. A system according to any one of claims 1 to 3, wherein said system further comprises a filter for attenuating the reflections of parasitic external sources, said filter being placed on the optical exit path of the optical collimating device.

* * * * *